United States Patent [19]

Watanabe

[11] Patent Number: 4,921,397
[45] Date of Patent: May 1, 1990

[54] WORK STACKING APPARATUS

[75] Inventor: Tohru Watanabe, Zama, Japan

[73] Assignee: Shin Caterpillar Mitsubishi Ltd., Tokyo, Japan

[21] Appl. No.: 305,012

[22] Filed: Feb. 2, 1989

[30] Foreign Application Priority Data

Mar. 18, 1988 [JP] Japan .................................. 63-35954

[51] Int. Cl.⁵ .............................................. B65G 57/00
[52] U.S. Cl. ............................ 414/788.4; 414/789.6;
414/790.4; 414/796.7; 414/796.9; 414/27;
414/923; 414/223; 414/744.2
[58] Field of Search ............... 414/788.8, 788.4, 790.4,
414/788.7, 789.6, 796.7, 792.9, 797.3, 798.5,
796.9, 797, 797.1, 795.8, 923, 27, 222, 223, 225,
226, 744.2

[56] References Cited

U.S. PATENT DOCUMENTS

| | | | |
|---|---|---|---|
| 2,350,273 | 5/1944 | Decker | 414/789.6 X |
| 4,024,963 | 5/1977 | Hautau | 414/795.8 X |
| 4,195,961 | 4/1980 | Waiblinger | 414/795.8 X |
| 4,196,511 | 4/1980 | Kolosov et al. | 414/789.6 X |
| 4,451,191 | 5/1984 | Torre | 414/796.7 X |
| 4,504,186 | 3/1985 | Richards | 414/792.9 X |
| 4,664,575 | 5/1987 | Ohmura et al. | 414/788.7 |
| 4,676,710 | 6/1987 | Shiraishi | 414/788.7 X |
| 4,720,227 | 1/1988 | Eberle | 414/788.4 |

FOREIGN PATENT DOCUMENTS 58-163827  9/1983  Japan .

Primary Examiner—Frank E. Werner
Assistant Examiner—James T. Eller, Jr.
Attorney, Agent, or Firm—Wegner & Bretschneider

[57] ABSTRACT

A work stacking apparatus for stacking a plurality of different type of works alternately which includes a plurality of stock rods each for stocking same kind of works in a stacked condition at predetermined work supply positions. A stacking arm is pivotally mounted for rocking motion between the work supply positions and a work receiving locator. Chucks are mounted on the stacking arm for chucking uppermost works at the different work supply positions alternately and releasing them at the work receiving locator. C-shaped forks are provided underneath the stacked works for pushing up the works one by one whenever the uppermost one of the works is taken out from the respective work supply positions.

4 Claims, 5 Drawing Sheets

WORK STACKING APPARATUS

BACKGROUND OF THE INVENTION

This invention relates to a work stacking apparatus for stacking, for example, a plurality of clutch plates and a plurality of clutch disks alternately.

Hitherto, when stacking clutch plates and clutch disks alternately for assembling a multiple disk clutch, a pair of transporting mechanisms are provided for transporting clutch plates and clutch disks separately to a common stacking position. In this construction, however, since separate transporting mechanisms are used for transporting clutch plates and clutch disks, the overall construction becomes complicated and control thereof becomes complicated as well.

SUMMARY OF THE INVENTION

It is therefore an object of the present invention to provide a work stacking apparatus which is simple in construction and can efficiently stack different kinds of works alternately.

In accordance with an aspect of the present invention, there is provided a work stacking apparatus for stacking a plurality of different types of works alternately comprising: a plurality of stocking means each for stocking same kind of works in a stacked condition at predetermined work supply positions, respectively; means for receiving said plurality of different types of works alternately; a stacking arm pivotally mounted for rocking motion between said work supply positions and said receiving means; means for rocking said stacking arm; chuck means mounted on said stacking arm for chucking uppermost works at the different work supply positions alternately and releasing them at said receiving means; and means for pushing up the stacked works one by one whenever the uppermost one of the works is taken out from the respective work supply positions.

The plurality of stocking means may comprise a first and a second stocking means for stocking a plurality of stacked first works such as clutch plates and a plurality of stacked second works such as clutch disks, respectively.

Preferably, the work stacking apparatus includes a rotary ring mounted for rotation in a horizontal plane and the plurality of stocking means include stock rods provided uprightly in an alternate fashion along a circumferential line on an upper face of the rotary ring. The stock rods for stocking the same kind of works are provided both at the work supply position and at a stand-by position circumferentially spaced from the work supply position.

The above and other objects, features and advantages of the present invention will become more apparent from the following description taken in conjunction with the accompanying drawings.

DESCRIPTION OF THE PREFERRED EMBODIMENT

Figure 1:
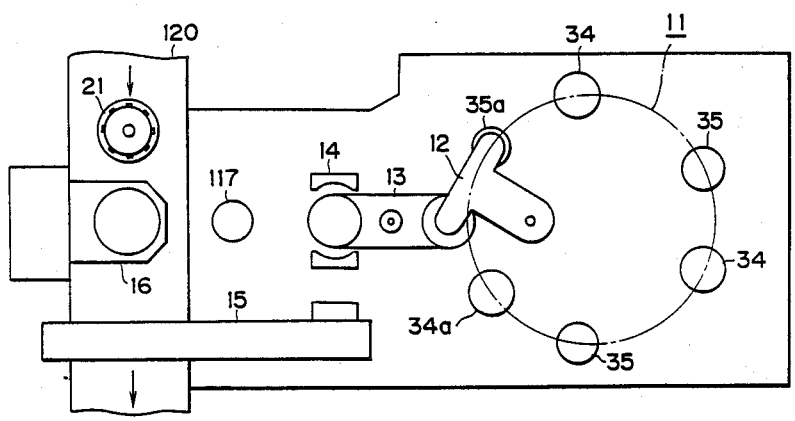
FIG. 1 is a schematic representation showing an entire arrangement of an automatic assembling apparatus for a multiple disk clutch.

In the following, the present invention will be described in detail in connection with an embodiment shown in the drawings.

Referring first to FIG. 1, an automatic assembling machine shown includes a work stocker 11, a stacking arm 12, a rotary arm 13, a gage unit 14, a transporting apparatus 15 and an aligning and assembling apparatus 16.

Figure 2A:
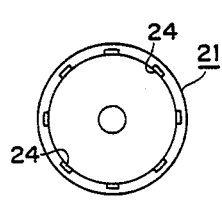
FIGS. 2A and 2B are a plan view and a side elevational view of a clutch guide, respectively.
Figure 3A:
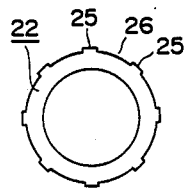
FIGS. 3A and 3B are a plan view and a side elevational view of a clutch plate, respectively.
Figure 4A:
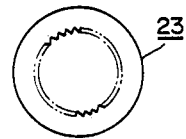
FIGS. 4A and 4B are a plan view and a side elevational view of a clutch disk, respectively.
Figure 2B:
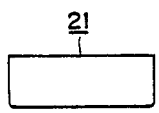
Figure 3B:
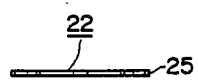
Figure 4B:
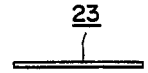

The automatic assembling machine fits a plurality of such clutch plates 22 as shown in FIGS. 3A and 3B and a plurality of such clutch disks 23 as shown in FIGS. 4A and 4B both as disk-shaped works into a clutch guide 21 as a vessel-shaped work shown in FIGS. 2A and 2B. In this instance, projections 25 formed on an outer periphery of each of the clutch plates 22 are fitted in recessed grooves 24 formed on an inner peripheral wall of the clutch guide 21. The clutch disks 23 have an outer diameter which is substantially equal to the outer diameter of the clutch plates 22 and a little smaller than the inner diameter of the clutch guide 21. It is to be noted that the clutch plates 22 and the clutch disks 23 may be commonly denoted by the word "work" or "works". In the following, the individual components of the automatic assembling machine will be described in order.

Figure 5:
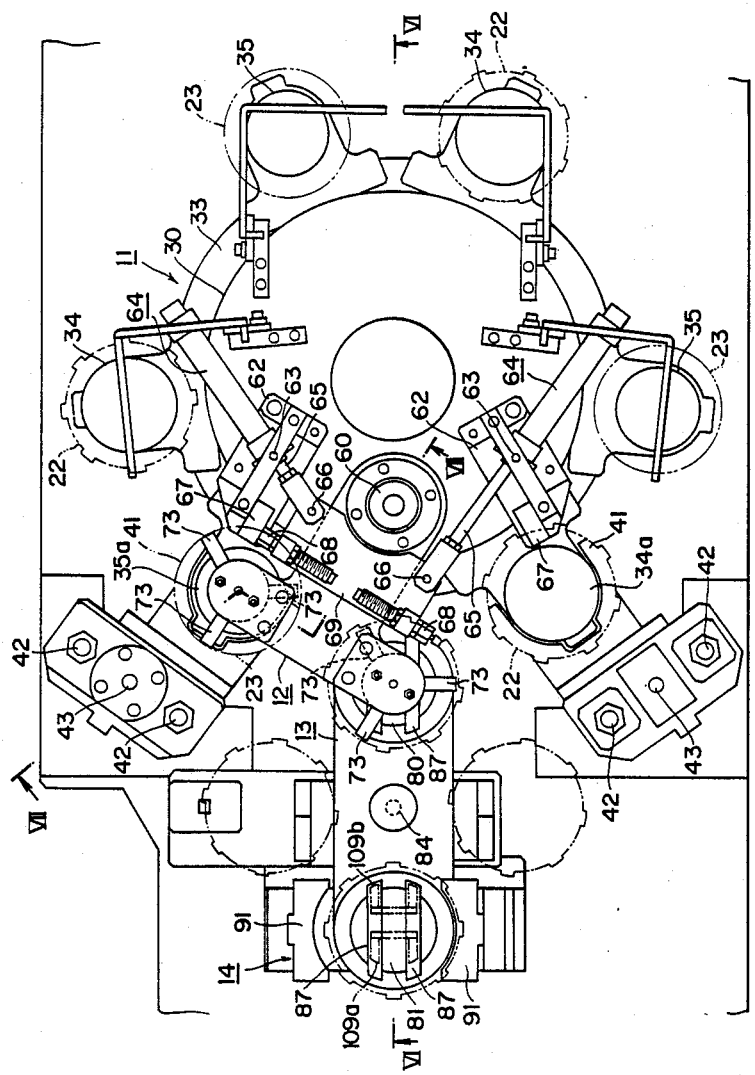
FIG. 5 is a plan view of a stacking device for stacking clutch plates and clutch disks as disk-shaped works in an alternate relationship.
Figure 6:
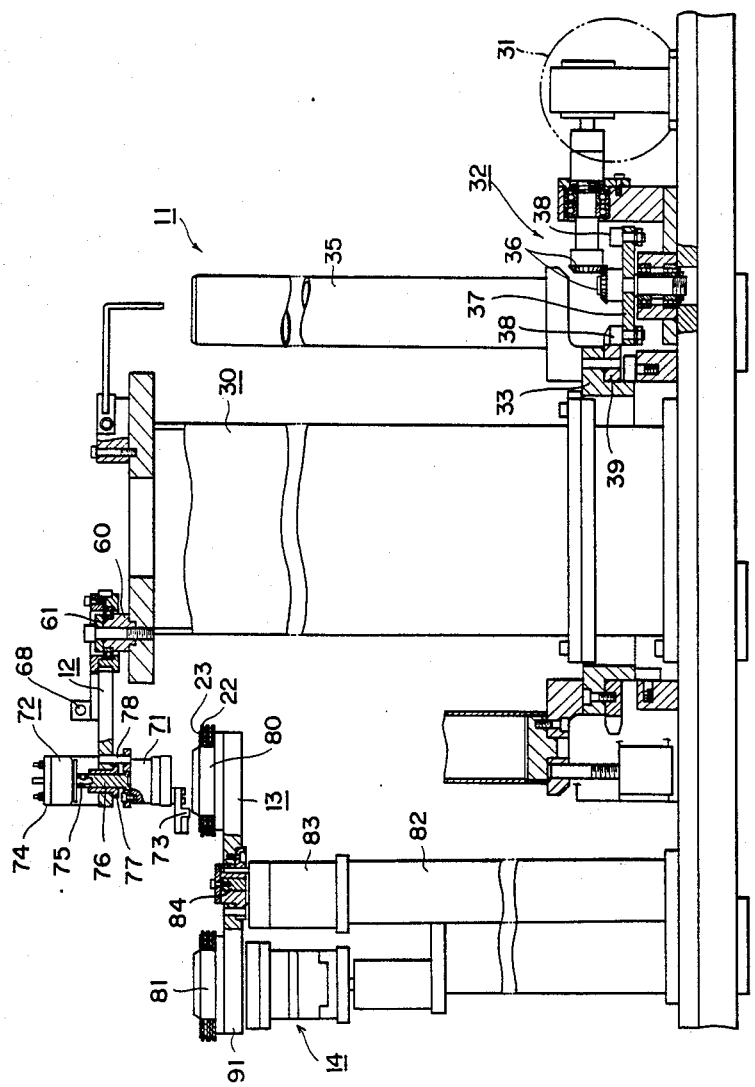
FIG. 6 is a sectional view taken along line VI—VI of FIG. 5.
Figure 7:
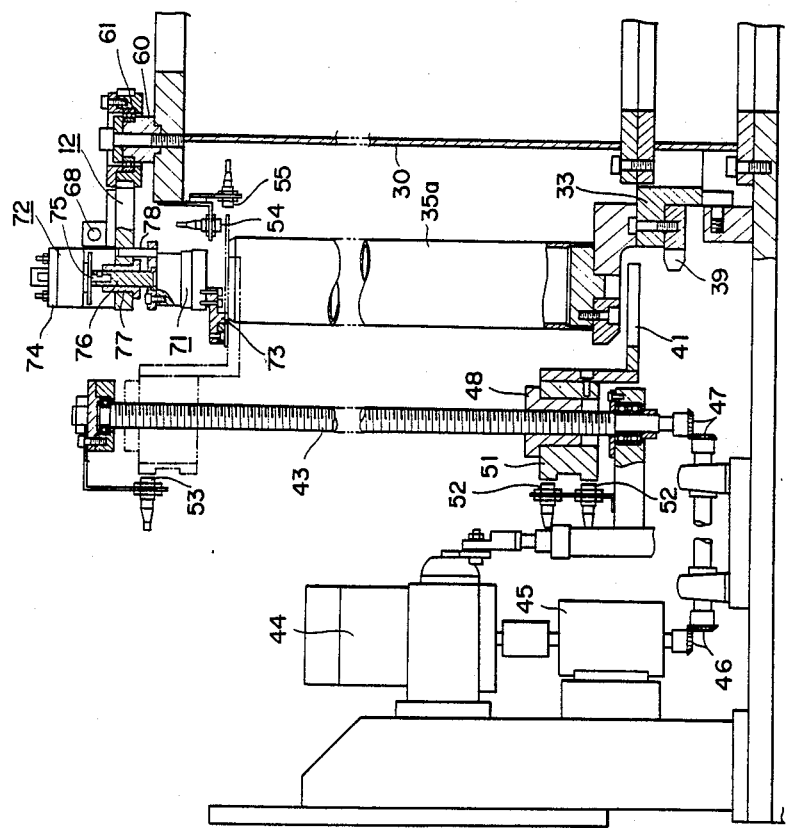
FIG. 7 is a sectional view taken along line VII—VII of FIG. 5.

(A) Work Stocker (FIGS. 5, 6 and 7)

The work stocker 11 includes a rotary ring 33 mounted for rotation in a horizontal plane at a lower portion of a center column 30 as shown in FIG. 6. The rotary ring 33 is connected to be rotated by 120 degrees by a motor 31 by way of a rotation transmitting mechanism 32. Three clutch plate stock rods 34 and three clutch disk stock rods 35 are provided uprightly in an alternate relationship along a circumferential line on an upper face of the rotary ring 33 as shown in FIG. 5. The clutch plate stock rod 34a and the clutch disk stock rod 35a, which are shown positioned individually at leftmost positions in FIG. 5, are positioned at respective work supplying positions and thus operate in pair. About 300 clutch plates 22 and clutch disks 23 are fitted on each of the rods 34 and 35, respectively.

The rotation transmitting mechanism 32 includes a bevel gear 36, a plurality of rollers 38 supported in a predetermined pitch for rotation on a disk 37 which is rotated by way of the bevel gear 36, a sprocket wheel 39 for meshing engagement with the individual rollers 38, and so on.

Rotation exerted from the motor 31 is transmitted to the rotary ring 33 integral with the sprocket wheel 39 by way of the rotation transmitting mechanism 32 so that the rotary ring 33 is rotated by an angle of 120 degrees at a point of time when the clutch plates 22 and clutch disks 23 are all supplied from the stock rods 34a and 35a, respectively, at the individual work supplying positions to empty the stock rods 34a and 35a. Consequently, the rods 34 and 35 which have been at their individual stand-by positions are shifted to the work supplying positions indicated at 34a and 35a, respectively.

A C-shaped fork 41 for pushing up works one by one is provided for each of the stock rods 34a and 35a at the supplying positions as shown in FIG. 5. The fork 41 is mounted for up and down movement along a pair of guide rods 42 and moved up and down by means of a ball screw 43. The ball screw 43 is rotated by a variable speed motor 44 by way of a clutch brake 45 and a pair of bevel gears 46 and 47 as seen in FIG. 7, and the fork 41 is mounted on a female screw 48 with which the ball screw 43 is held in threaded engagement. A member 51 is provided on the female screw 48, and a sensor 52 such as a contactless switch is mounted at a predetermined position for detecting a lower limit position of the member 51 while another sensor 53 such as a contactless switch is located at another predetermined position for detecting an upper limit position of the member 51. Further sensors 54 and 55 such as contactless switches for detecting a face of a work at a lifted position and for detecting a work having a different diameter, respectively, are disposed near upper ends of the stock rods 34a and 35a, respectively, at the work supplying positions as shown in FIG. 7.

When an uppermost one of the works is to be taken out from the top end of the stock rod 34a or 35a by means of a chuck of the stacking or layering arm 12 which will be hereinafter described, at a point of the time when the uppermost work is chucked, the variable speed motor 44 is activated to move down the fork 41 once to separate the uppermost work from the other works below, and then once the uppermost work is taken out, the variable motor 44 is driven reversely to move up the fork 41 until the sensor 54 again detects the presence of a work. The fork 41 is thus stopped at a position moved up by a distance equal to the thickness of the work from the formerly lifted position. Consequently, the upper end of the works is maintained constant. At the same time, in case the work has a different diameter, the different diameter work is detected by the different diameter work discriminating sensor 55.

(B) Stacking Arm (FIGS. 5, 6 and 7)

The stacking arm 12 has a T-shaped configuration as seen in FIG. 5 and is supported at a base end thereof for pivotal motion on a shaft portion 60 at an upper face of the center column 30 by way of a bearing 61 or the like as shown in FIGS. 6 and 7. A pair of arm rocking cylinders 64 is supported for pivotal motion by means of shafts 63 on a pair of mounting plates 62 provided on the upper face of the center colum 30 as shown in FIG. 5, and an end of a piston rod 65 of each of the cylinders 64 is connected to a member 69 integral with the T-shaped stacking arm 12 by means of a shaft 66. Accordingly, as the piston rods 65 of the pair of cylinders 64 are alternately driven to be extended and contracted, the stacking arm 12 is rocked around a fulcrum provided by the shaft portion 60. A stopper 67 for restricting the range of rocking motion of the stacking arm 12 is provided on the mounting plate 62, and an adjusting screw 68 screwed into a member on the stacking arm 12 side is contacted with and stopped by the stopper 67.

A pair of sets each including a chuck 71 for gripping a clutch plate 22 or a clutch disk 23 thereon and a solenoid for moving the chuck 71 up and down is provided at each of opposite end portions of the cross bar of the T-shape of the stacking arm 12 as seen in FIGS. 6 and 7. Each of the chucks 71 is an air chuck including three way claws 73 mounted for movement in radial directions thereon as seen in FIG. 5, and when the three way claws 73 of the chuck 71 are expanded or moved radially outwardly, they are pressed against an inner peripheral face of a clutch plate 22 or a clutch disk 23. Meanwhile, each of the solenoids 72 is mounted on a mounting plate 74 on the stacking arm 12 as shown in FIGS. 6 and 7, and a shaft 76 is connected in an integral relationship to a driving shaft 75 for the solenoid 72. The shaft 76 is fitted for up and down movement in a sleeve 77 fitted in the stacking arm 12, and the air chuck 71 is connected to the solenoid 72 by way of the shaft 76. A pin 78 for preventing rotation of the chuck is provided in an integral relationship at an upper portion of the chuck 71 and fitted for up and down movement in the stacking arm 12.

When the three way claws 73 of the air chuck 71 are in a condition retracted to the center side, that is, in a radially inwardly moved position, the shaft 76 is moved down by the solenoid 72 so that the claws 73 are fitted into the inside of one of the clutch plates 22 or clutch disks 23 at an uppermost position of the stock rod 34a or 35a, and then the three claws 73 are expanded or moved radially outwardly to hold the one work from the inside, whereafter the work is moved up by activation of the solenoid 72 and then the stacking arm 12 is pivoted by the cylinder 64 to move the work in a horizontal direction.

The stacking arm 12 is rocked leftwardly and rightwardly to alternately chuck the clutch plates 22 and the clutch disks 23 at the top ends of the stock rods 34a and 35a by means of the left and right chucks 71 thereon and stack the works on a locator 80 which is located at an end of the rotary arm 13 and will be hereinafter described in detail. Thus, a total of six works, that is, three clutch plates 22 and three clutch disks 23, are stacked on the locator 80.

(C) Rotary Arm

The rotary arm 13 includes a pair of stacking locators 80 and 81 mounted at the opposite end portions thereof as shown in FIG. 6, and a central portion of the rotary arm 13 is integrally fitted on and screwed to a rotary shaft 84 of a motor 83 located at an upper end of a support 82. If up to six works are fitted and stacked on one of the locators 80 and 81 by the stacking arm 12, then the rotary arm 13 is rotated by an angle of 180 degrees around the rotary shaft 84 at the center thereof to feed the stacked works to the gage unit 14. Each of the locators 80 and 81 has a pair of recessed grooves 87 formed thereon such that a pair of chuck claws of the transporting apparatus 15 which will be hereinafter described may be inserted into the recessed grooves 87 to take out the stacked works from the locator 80 or 81.

Figure 8:
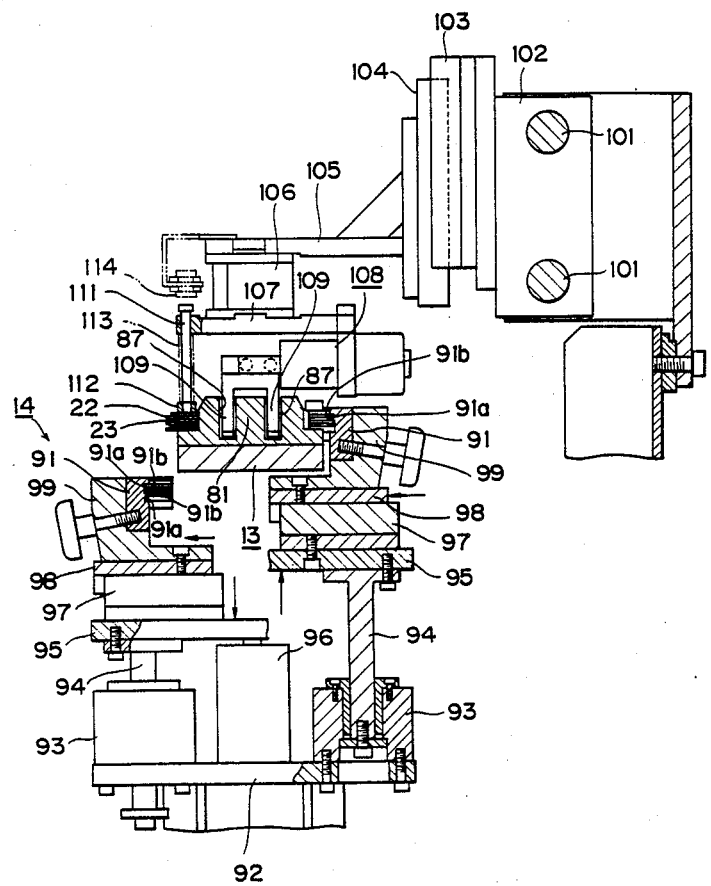
FIG. 8 is a cross sectional view of a gage unit and a transporting apparatus.

(D) Gage Unit (FIGS. 5, 6 and 8)

The gage unit 14 includes a pair of gages 91 disposed in an opposing relationship to each other and having an arcuate configuration as seen in FIG. 5 and a comb-shaped cross section as seen in FIG. 8. It is to be noted that, in FIG. 8, the right-hand side gage 91 is shown at its upwardly moved position while the left-hand side gage 91 is shown at its downwardly moved position. The gage unit 14 includes a vertically movable plate 95 mounted for up and down vertical movement under the guidance of a rod 94 which is fitted in a slide bearing 93 of a base 92. The vertically movable plate 95 is moved up and down by a vertically moving cylinder 96 mounted on the base 92. A pair of horizontal guide members 97 are disposed on a straight line on an upper face of the vertically movable plate 95, and a slider 98 is fitted for sliding movement in each of the guide members 97. A gage receiver 99 is provided in an integral relationship on each of the sliders 98, and the gages 91 are individually screwed to the gage receivers 99. The gage receivers 99 in pair are moved in directions toward and away from each other by individual air cylinders not shown.

The gages 91 normally assume their stand-by positions as shown by the left-hand side gage 91 in FIG. 8 wherein they are at the downwardly moved positions and spaced away from each other in an open condition. Then, if six stacked works are fed to the gage 91 by the rotary arm 13, the gages 91 are moved upwardly as shown by the right-hand side gage 91 in FIG. 8 and further moved toward each other, whereupon they hold the stacked works fitted on the locator 81 from the opposite sides. In this instance, the projections 25 of the clutch plates 22 are fitted into the recessed grooves 91a of the gage 91 while projections 91b of the gages 91 are fitted with the outer peripheries of the clutch disks 23.

If the six works are stacked in the correct order when the gages 91 are closed or moved toward each other, then the gages 91 can advance to individually predetermined positions. On the other hand, if the six works are not stacked in the correct order or a work having a different thickness is mixed in the six works, or else if more than six works are stacked, the gages 91 will be stopped forwardly of the predetermined positions, which will be detected by a sensor not shown.

The gages 91 have another function to center the clutch plates 22 and the clutch disks 23.

(E) Transporting apparatus (FIG. 8)

The transporting apparatus 15 includes guide rods 101 extending in a horizontal direction, and a horizontal slider 102 fitted on the guide rods 101 for sliding movement by an air cylinder not shown or the like. A vertical guide member 103 is mounted in an integral relationship on the slider 102, and a vertical slider 104 is fitted on the vertical guide member 103 for up and down vertical movement by an air cylinder not shown or the like. A transporting head 107 is mounted on the vertical slider 104 by means of supporting members 105 and 106. A chuck 108 for holding a work thereon is provided on the transporting head 107. The chuck 108 includes a pair of claws 109 having an inverted U-shaped configuration as shown in FIG. 8. The claws 109 are inserted in the recessed grooves 87 of the locator 81 when they are in such an inwardly moved or closed condition as shown by the left-hand side claw 109a in FIG. 5, and when they are moved outwardly or opened as shown by the right-hand side claw 109b in FIG. 5, they hold works from the inside.

Thus, after the gages 91 are retracted from the works, the chuck 108 which holds the works thereon by means of the claws 109 thereof is moved up under the guidance of the vertical guide member 103, and then the works are taken out of the locator 81 and the stacked works are transported in a horizontal direction along the guide rods 101.

Further, a plurality of pressing rings 112 are provided around the claws 109 of the chuck 108 as shown in FIG. 8. The pressing rings 112 are each supported on a rod 111 fitted for up and down movement on the transporting head 107 and normally urged downwardly by a spring 113. A stack number sensor 114 such as a contactless switch is located adjacent and above each of the rods 111.

Thus, stacked works held by the claws 109 are pressed by the pressing rings 112 from above to prevent displacement of the works during transportation. Since ring 112 assumes a position lower than its predetermined vertical position when the number of the stacked works is smaller than 6, the vertical position of the rod 111 is detected by the sensor 114 to judge whether or not the works are in a correctly stacked condition.

When a different work is detected at the stocker 11, when a rejected or defective work is detected by checking at the gage unit 14 and when a deficiency in the number of works is detected at the pressing ring 112, the works are transported to a discharging stock rod 117 (FIG. 1) having a similar configuration to the stock rods 34 and 35 of the work stocker 11, and then at the position, the chuck 108 is actuated to close the claws 109 to remove the claws 109 from the works to permit the works to drop onto the discharging stock rod 117.

In case there is no error with the works, they are then transported to the aligning and assembling apparatus 16.

While the invention has been described and shown with particular reference to the preferred embodiment, it will be apparent that variations might be possible that would fall within the scope of the present invention which is not intended to be limited except as defined in the following claims.

What is claimed is:

1. A work stacking apparatus for stacking a plurality of different types of works alternately, comprising:
   a rotary ring mounted for rotation in a horizontal plane;
   first stocking means for stocking a plurality of stacked first works at a first work supply position and at a first stand-by position circumferentially spaced from the first work supply position, said first stocking means comprising first stock rods provided uprightly along a circumferential line on an upper face of said rotary ring at the first work supply position and at the first stand-by position;
   second stocking means for stocking a plurality of stacked second works at a second work supply position and at a second stand-by position circumferentially spaced from the second work supply position, said second stocking means comprising second stock rods provided uprightly along a circumferential line on an upper face of said rotary ring at the second work supply position and at the second stand-by position, said first and second stock rods being provided alternately;
   means for receiving said first works and said second works alternately;
   a stacking arm pivotally mounted for rocking motion about a vertical axis between said first and second work supply positions and said receiving means;
   means for rocking said stacking arm;
   chuck means mounted on said stacking arm for chucking uppermost ones of said first and second works at the first and second work supply positions alternately and releasing them at said receiving means; and
   means for pushing up the stacked first and second works whenever the uppermost one of the first and second works is taken out from said first and second stocking means.

2. The work stacking apparatus according to claim 1 wherein said pushing up means comprise forks each provided underneath the stacked first and second works at the first and second work supply positions.

3. The work stacking apparatus according to claim 1 wherein said first work is a clutch plate and said second work is a clutch disk.

4. The work stacking apparatus according to claim 1 wherein a pair of chuck means is mounted on said stacking arm each for chucking first and second works, respectively.

* * * * *